(12) United States Patent
Wiemeyer et al.

(10) Patent No.: US 7,737,360 B2
(45) Date of Patent: Jun. 15, 2010

(54) ENCLOSURE APPARATUS, SYSTEM AND METHOD

(75) Inventors: James F. Wiemeyer, Homer Glen, IL (US); Jack D. Tison, Bourbonnais, IL (US); Andrew J. Stroede, Frankfort, IL (US); Scott R. Hartman, Oak Forest, IL (US)

(73) Assignee: Panduit Corp., Tinley Park, IL (US)

( * ) Notice: Subject to any disclaimer, the term of this patent is extended or adjusted under 35 U.S.C. 154(b) by 304 days.

(21) Appl. No.: 11/383,667

(22) Filed: May 16, 2006

(65) Prior Publication Data
US 2006/0269216 A1 Nov. 30, 2006

Related U.S. Application Data

(60) Provisional application No. 60/684,085, filed on May 24, 2005.

(51) Int. Cl.
*H02G 3/08* (2006.01)
(52) U.S. Cl. .................. 174/50; 174/481; 174/57; 220/3.2; 220/3.3; 361/679.01
(58) Field of Classification Search ............. 174/50, 174/53, 57, 58, 480, 481, 17 R; 220/3.2–3.9, 220/4.02; 248/906, 343; 439/535; 385/134, 385/135, 147; D13/160, 152; 361/724, 730, 361/600, 601, 679.01
See application file for complete search history.

(56) References Cited

U.S. PATENT DOCUMENTS

| | | | |
|---|---|---|---|
| 5,573,321 A | | 11/1996 | Bell, Jr. |
| 5,721,394 A | * | 2/1998 | Mulks .......................... 174/58 |
| 6,132,242 A | * | 10/2000 | Hall et al. .................... 361/822 |
| 6,649,830 B1 | * | 11/2003 | Bartlett et al. ................ 174/50 |
| 6,727,429 B1 | * | 4/2004 | Koessler ....................... 174/50 |
| 6,788,786 B1 | * | 9/2004 | Kessler et al. .......... 379/413.04 |

OTHER PUBLICATIONS

US 2006/0231278 A1 (Cardenas), "Expandable Structures Wiring Box", Oct. 19, 2006.*
Honeywell Structural Wiring Solutions Catalog, 13 pages, Dec. 2004.
SmartAMERICA Development Corporation's HomeBoxx All-inclusive Home Automation Brochure, 2 pages, Aug. 2000.

* cited by examiner

*Primary Examiner*—Angel R Estrada
(74) *Attorney, Agent, or Firm*—Robert A. McCann; Christopher S. Clancy; James H. Williams

(57) ABSTRACT

An enclosure apparatus comprises a single receptacle comprising a patch member connected to electrical equipment in a remote location and at least one communication device. The communication device may comprise a microprocessor for processing data received from the electrical equipment in the remote location. The enclosure apparatus is often used in connection with building automation equipment.

12 Claims, 6 Drawing Sheets

ENCLOSURE APPARATUS, SYSTEM AND METHOD

CROSS-REFERENCE TO RELATED APPLICATION

This application claims priority to U.S. Provisional Application No. 60/684,085, filed May 24, 2005, the entirety of which is incorporated herein by reference.

FIELD OF THE INVENTION

This invention relates to an enclosure apparatus and, more particularly, to an enclosure apparatus associated with electrical equipment and cable connections.

BACKGROUND

Buildings, in particular office buildings, often include various enclosures for housing electrical equipment and electrical connectors. Intricate pathworks of cables connect the electrical equipment and connectors. Cables connect electrical equipment located in a main equipment room to telecommunications equipment located in telecommunications rooms on different floors, for example. Cables associated with the telecommunications equipment also extend into additional enclosures positioned in strategically placed zones throughout the different floors to establish electrical connections, such as ethernet connections.

These enclosures, often called "zone boxes," house electrical connectors adapted to receive cables extending from the telecommunications equipment, typically positioned in locations remote from the zone boxes. Additional cables may extend out of the electrical connectors to specific work or coverage areas, to establish connections with a mix of local devices, such as personal computers, printers, workstations and certain video cameras.

Still additional enclosures may house communication devices, such as application specific control devices, adapted to process data received from remote locations, such as the telecommunications room or other remote locations where local devices, such as building automation equipment, reside. To accomplish the processing, the communication devices connect to zone boxes on the one hand and directly to the local devices on the other. In this way, two-way communication between the telecommunications room and local device may be established and maintained. Cable pathways, such as conduits, raceways, trays or ladders are often used to route these cables.

Thus, buildings utilize multiple enclosures for various devices, with cables running from the telecommunications room to zone box enclosures and cables running from various local devices to communication devices housed in other enclosures. This configuration results in a higher initial quantity of required materials, more initial installation labor, and more costly implementation of ongoing moves and changes to building systems.

There is a need, therefore, for an enclosure apparatus that accomodates various electrical equipment, connectors and cables. The enclosure apparatus is preferably easy to use and adapt to various building environments.

SUMMARY OF THE INVENTION

The present invention relates to an improved enclosure apparatus as well as systems and methods for using the same.

In one embodiment, the enclosure apparatus comprises a single receptacle comprising a base member mountable to a building structure and walls connected to the base member, a moveable patch member positioned within the single receptacle and at least one communication device comprising a microprocessor positioned within the single receptacle. The patch member is connected to at least one data cable, which enters the single receptacle from a first location remote therefrom and the communication device is connected to the patch member.

In another embodiment, the enclosure apparatus comprises a single receptacle comprising a base member mountable to a building structure and top, bottom and side walls connected to the base member, at least one aperture defined in at least one of base member and the walls for receiving one or more cables, at least one patch member positioned within the single receptacle and at least one cable separator comprising a barrier wall positioned within the receptacle and extending in a direction generally parallel to the side walls of the receptacle. The patch member may be electrically connected to the one or more cables.

In still another embodiment, the enclosure apparatus of the present invention comprises a single receptacle comprising a base member mountable to a building structure and walls connected to the base member, a moveable patch member positioned within the single receptacle and a mounting device adapted to receive at least one communication device, the communication device capable of being connected to at least one data cable through the patch member. The patch member may be connected to the at least one data cable, which enters the single receptacle from a first location remote therefrom.

The enclosure apparatus may incorporate additional features and structure. The walls of the receptacle may define apertures for receiving the at least one data cable.

The patch member may further comprise at least one electrical connector comprising at least one of coaxial connectors, D-subminiature connectors, punchdown connectors, optical fiber connectors and rack-mounted modular ethernet connectors. The communication device may comprise a controller or sensor and the microprocessor may be adapted to process data received from the first remote location. The apparatus may further comprise a mounting device comprising a plurality of regularly spaced apertures and/or a cable separator comprising a barrier wall for providing a dielectric barrier between adjacent cables. Two or more opposing barrier walls may define a channel therebetween, which is protectible with a hinged cover. These barriers may also be configured to form an inverted U-shape to help separate the patch member from the communication devices. The enclosure apparatus may further comprise a restraint for confining movement of cables in a radial direction.

In further embodiments, the present invention is directed to systems for data transmission. In one such embodiment, the system comprises electrical equipment positioned within a first location and connected to at least one data cable and a single receptacle remote from the first location. The single receptacle comprises a base member mountable to a plenum in a building structure and walls connected to the base member, a patch member and at least one communication device comprising a microprocessor, wherein the patch member and the communication device are connected to the at least one data cable, with the communication device being connected to the at least one data cable through the patch member. In addition, the communication device is adapted to receive data from the electrical equipment, process the data and transmit a communication based on the processed data to at least one of the electrical equipment in the first location and a second location within the building. Typically, the second location is remote from the first location and the single receptacle and may comprise building automation equipment.

The system may also include various other components. For example, the walls of the single receptacle may comprise a grounding stud and a vent. The at least one data cable may be an ethernet data cable. The communication device may comprise one of a controller and a sensor and communicate wirelessly with other devices within the building. The system can further comprise a mounting device positioned within the receptacle for receiving and carrying the communication device.

The enclosure of the present invention may also be used in methods for wiring a building. The method may comprise providing a single enclosure comprising at least one patch member and at least one communication device, connecting a first cable extending from a central communication area to the patch member and connecting a second cable from the at least one patch member to the at least one communication device.

BRIEF DESCRIPTION OF DRAWINGS

Certain embodiments of the presently invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

DETAILED DESCRIPTION

The present invention relates to an enclosure apparatus and a system or method for employing the same. The enclosure apparatus includes a single receptacle comprising a base member mountable to a building and walls connected to the base member. A moveable patch member connected to at least one data cable from a remote location may be positioned within the single receptacle. One or more communication devices connected to the at least one data cable through the patch member may also reside in the single receptacle. The one or more communication devices may comprise low voltage equipment, such as controllers for operating local devices, including building automation equipment, or high voltage equipment. Cables associated with the low and high voltage equipment may extend into and connect with the patch member. The enclosure may be mounted on a wall, or within the ceiling or floor of a building.

Figure 1:
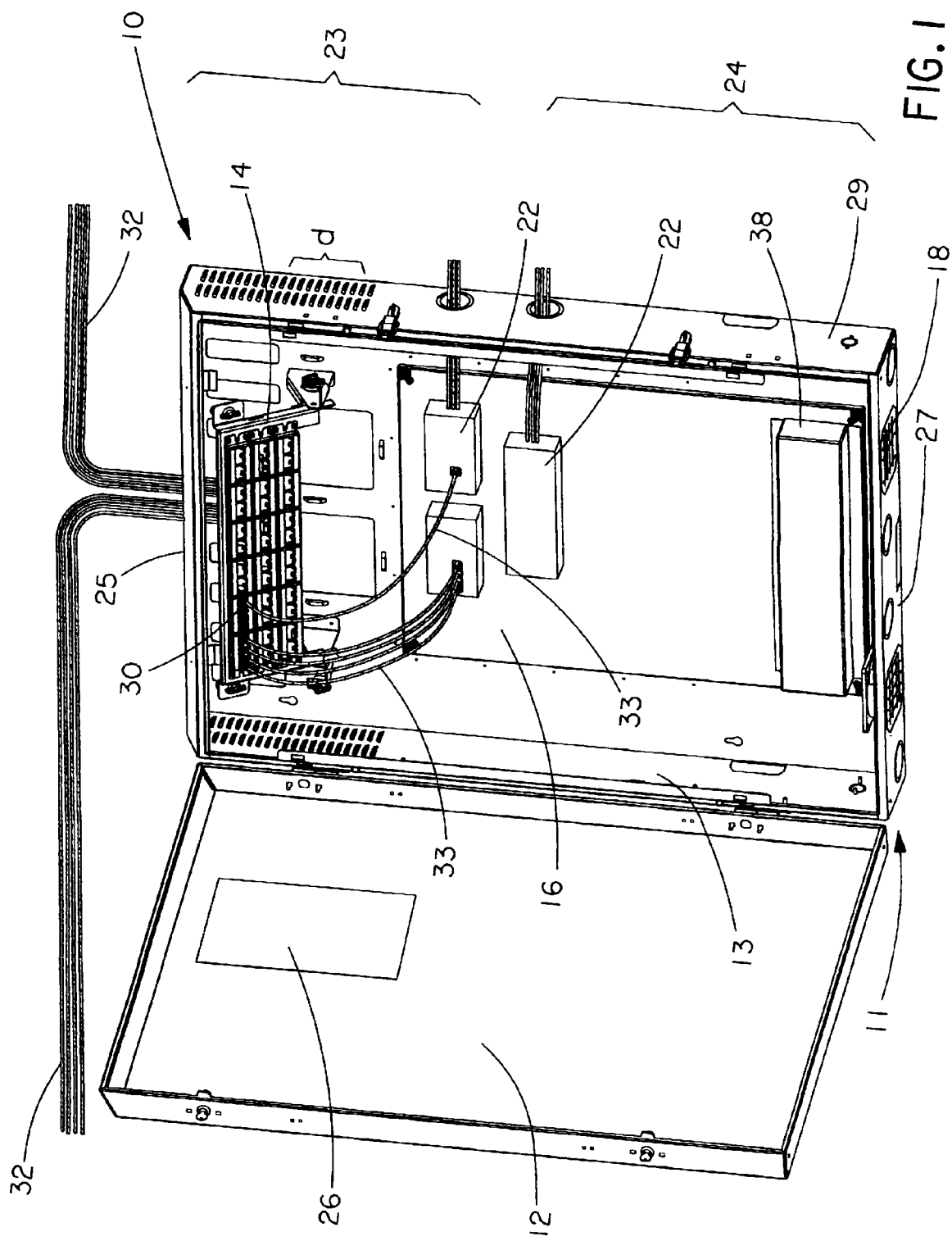
FIG. 1 is a perspective view of one embodiment of the enclosure apparatus of the present invention for routing cables within a building.

Referring now to FIG. 1, one embodiment of the enclosure apparatus 10 of the present invention is shown. Enclosure apparatus 10 may include receptacle 11, door 12, moveable patch member 14, mounting device 16, at least one cooling port 18 and communication devices 22. As used herein, the term patch member 14 means any device for holding electrical connectors used with cables. In certain embodiments, the distance d between patch member 14 and communication devices 22 is between about 1.0 inch to about 60.0 inches and, more particularly, between about 6.0 inches to about 25.0 inches.

Enclosure 10 comprises receptacle 11, which includes base member 13 and four walls. Receptacle 11 may further comprise upper portion 23 and lower portion 24. Base member 13 may be adapted for mounting on a building structure and may comprise brackets and fasteners. The walls may comprise top wall 25, bottom wall 27 and side walls 29. Upper portion 23 typically comprises patch member 14, though patch member 14 can be located in various locations throughout enclosure 10. Lower portion 24 typically comprises mounting panel 16, which can also be located throughout enclosure 10. Each of top wall 25, bottom wall 27 and side walls 29 may comprise knockouts or apertures 31 (see FIG. 4) for receiving cables from electrical equipment in remote locations. Electrical equipment in a first remote location may, for example, include telecommunications equipment in a telecommunications room, a main server or building automation equipment located throughout the building.

Door 12 may be hinged or screwed to enclosure 10. Door 12 optionally includes window 26 for viewing electrical components once they have been installed in enclosure 10. Door 12 may also include lock assembly (not shown) to prevent tampering with electrical components.

Patch member 14 may take the form of a modular patch panel, punchdown wiring blocks or combinations thereof. Patch member 14 may comprise electrical connectors 30, including coaxial connectors, D-subminiature connectors, optical fiber connectors and rack-mounted modular ethernet connectors, such as RJ45 jacks and punchdown connectors. First cables 32 may extend to connectors 30 of patch member 14 from the above-described electrical equipment positioned in remote locations. Second cables 33 may extend from patch member 14 to and from communication devices 22.

Figure 2:
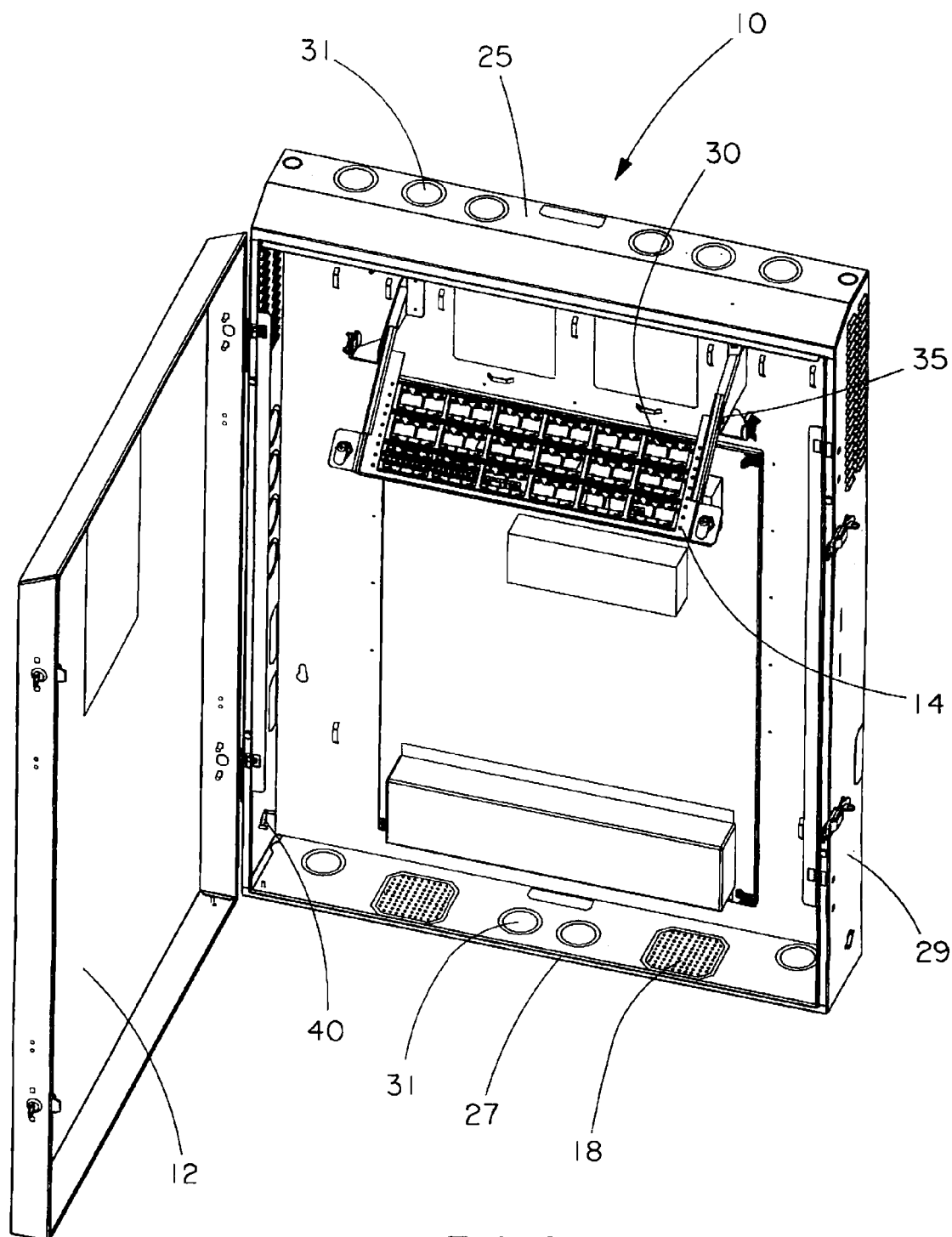
FIG. 2 is a perspective view of the invention of FIG. 1, showing the hinged patch member in its downward position, without cabling or controls being shown.

As shown in FIG. 2, moveable patch member 14 may include hinge 35 to tilt downwardly, thereby allowing easy access to cables 32 entering from both the front and rear of patch member 14. This configuration allows physical access to the rear of the cable connections so that installers and maintenance personnel can see the hardware and avoid working on connections concealed from sight.

Figures 3A, 3B:
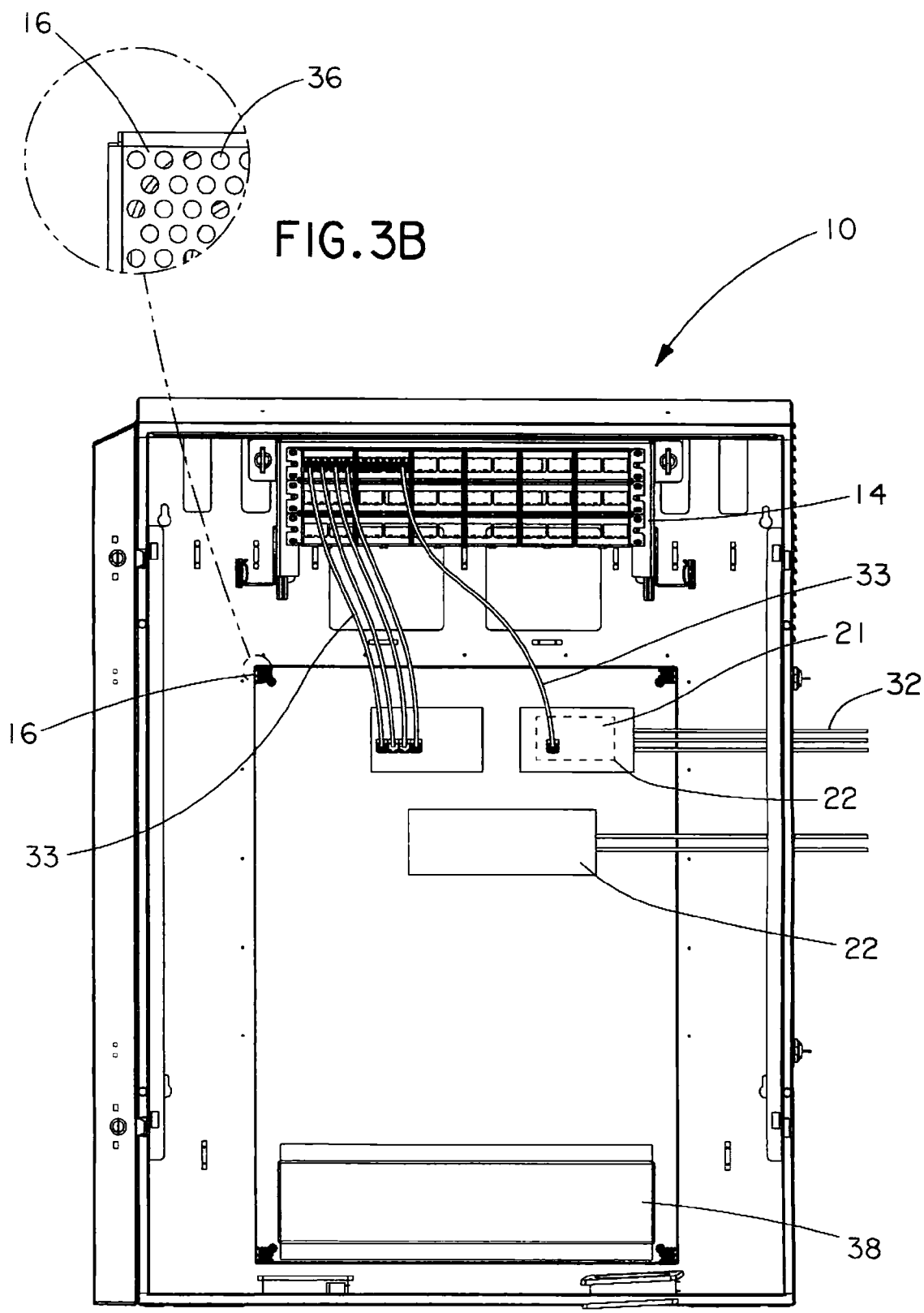
FIG. 3A is a front elevational view of the present invention of FIG. 1.
FIG. 3B is an enlarged view of the mounting board shown in FIG. 3A.

Referring to FIGS. 3A and 3B, mounting device 16 may comprise a panel carrying a plurality of mounting apertures 36, adapted to receive communication devices 22. Mounting device 16 can quickly accommodate varied equipment packages with various fasteners known to those of skill in the art. In one embodiment, self-tapping screws may be employed with mounting arrangements such as flanged housings and DIN rails. In an alternate embodiment, mounting device 16 occupies virtually the entire inside area of enclosure 10, to allow various patch elements, such as standard rack unit bracketry, or punchdown blocks to mount directly on mounting device 16. Mounting device 16 may also simply comprise a bracket.

Cooling ports 18 are adapted to cool active electronic equipment positioned within enclosure 10. Enclosure 10 may also include mounting provisions for forced cooling fans.

Depending on building layouts and location of enclosure apparatus 10 within the building, communication devices 22 may comprise one or both of low and high voltage equipment. Communication devices 22 typically comprise microprocessor 21 for processing data received over first cables 32 from a first location remote from the enclosure apparatus. Communication devices 22 are also adapted to transmit communication based on the processed data to either the source of the data at the first remote location or other devices positioned at second locations remote from the first location and enclosure apparatus 10. It bears noting that devices in the first and second remote locations may be hard-wired directly into communication devices 22 within receptacle 11 or communicate wirelessly therewith via electrical or radio frequency signals. Under these circumstances, communication devices 22 still typically remain connected to patch member 14 for connectivity to still other remote locations. Various types of low voltage equipment may be employed. Low voltage equipment may, for example, include controllers, such as programmable logic controllers, access control modules, HVAC controllers or lighting controllers and sensing devices, such as environmental sensors or radio transceivers with remote antennas. Alternatively or additionally, low voltage equipment may include screw terminal blocks, din rail mounted equipment, punchdown blocks for data cabling, rack mount brackets, switches or patch panels, relays, data acquisition units, fiber-to-copper media converters, protocol mediator boxes, power supplies and graphic displays. This low voltage equipment is often connected to local devices 37, such as building automation equipment (e.g., HVAC, physical access control, fire and video surveillance, lighting, paging clock systems).

High voltage equipment 38 can include screw terminal blocks, power disconnect switches, cabinet lighting, fuse blocks, circuit breakers, transformers, high voltage barrier switches or power strips. Although high voltage equipment 38 may be connected to patch member 14, some high voltage equipment 38, typically positioned in lower portion 24 of enclosure 10, may not be so connected. In addition, high voltage equipment may be connected to communication devices 22, as a source of power. Protective barriers may enclose at least a portion of high voltage equipment to help prevent electrical discharge or shock. Protective barriers may be metallic, dielectric or transparent dielectric.

Grounding stud 40, as seen in FIG. 2, may also optionally be added to enclosure 10. The purpose of grounding stud 40 is to ground enclosure apparatus 10 to avoid unwanted electric discharge.

Figure 4:
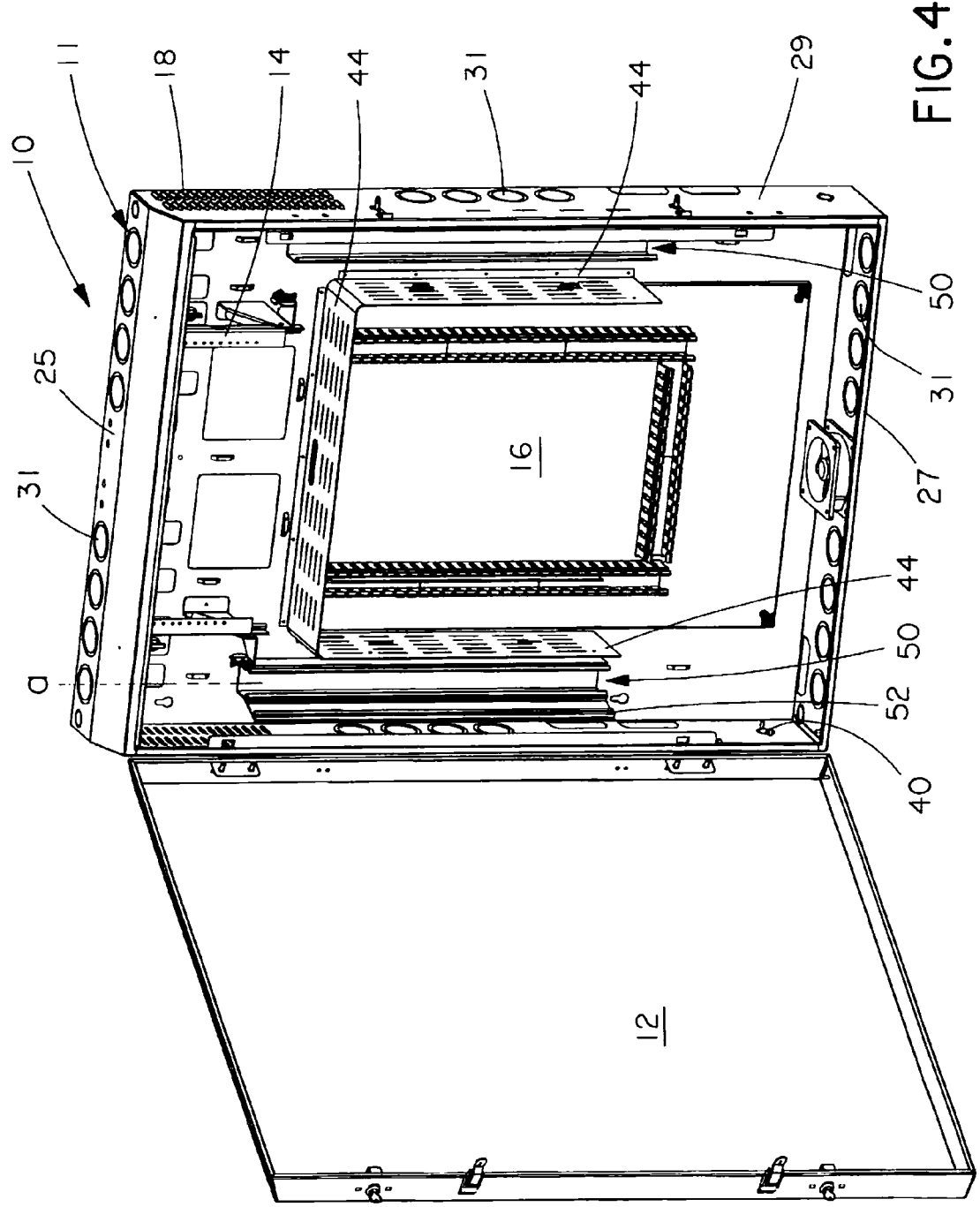
FIG. 4 is a front perspective view of the enclosure apparatus of the present invention, further comprising cable separators.
Figure 5:
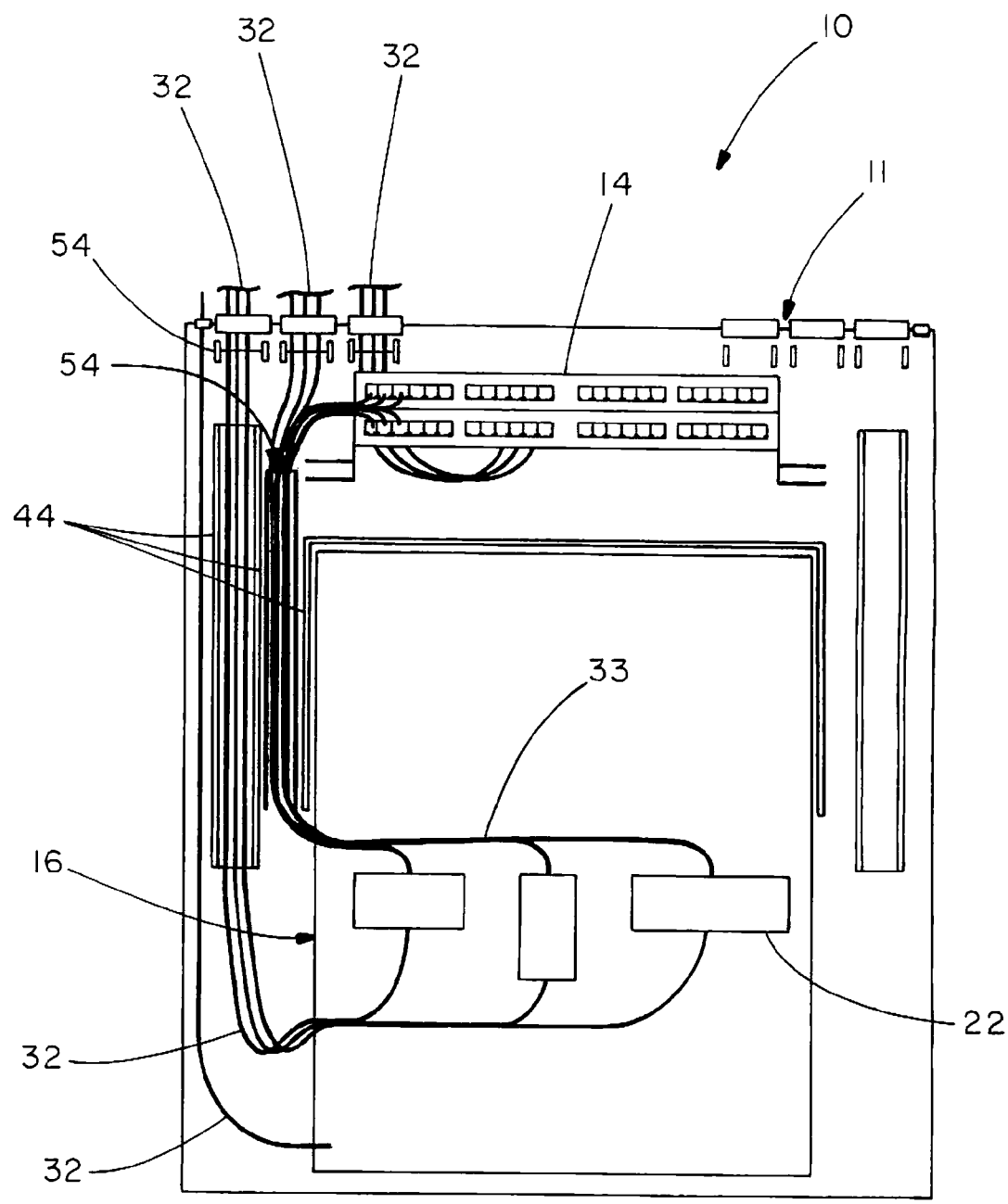
FIG. 5 is a front elevational view of the enclosure apparatus of the present invention, showing the cable separators of FIG. 4.

As shown in FIGS. 4 and 5. enclosure 10 may comprise knockouts or apertures 31 and cable separators 44 for receiving and managing these cables.

Knockouts 31 comprise apertures adapted to receive incoming cables from remote locations and may be positioned on base member 13, top wall 25, bottom wall 27 or side walls 29 of receptacle 11. Knockouts 31 are preferably arranged so that cable bundles do not criss-cross.

As best seen in FIG. 5, cable separators 44, comprising at least one barrier wall, are designed to separate and provide a dielectric barrier between adjacent first and second cables 32 and 33 and may be constructed of plastic, such as polyvinyl chloride, or metal. Separators 44 segregate cables 32 and 33 from a point of entry at knockouts 31 to at or near communication devices 22 to which cables 32 and 33 may be connected. Separators 44 advantageously prevent high voltage cables (e.g., cables calling for 600 Vrms insulation) from physically contacting low voltage cables (e.g., cables calling for 300 Vrms insulation). Separators 44 may comprise opposing walls defining channels 50 therebetween. Channels 50 are typically aligned with knockouts 31 along an axis a and hinged cover 52 may be positioned over channel 50 to secure cables 32 and 33 between opposing walls.

The positioning of cable separators 44 is variable. Cable separators 44 are typically positioned parallel to side wall 29 of receptacle 11. Separators 44 may also be configured to form an inverted U-shape, as shown in FIGS. 4 and 5. This orientation separates patch member 14 and communication device 22 and prevents cables 32 and 33 from contacting communication devices 22 and high voltage equipment 38.

To further manage cables 32 and 33 within enclosure 10, restraints 54 may be provided. Restraints 54 help confine movement of cables 32 and 33 in a radial direction and are typically positioned adjacent patch member 14. When sufficient cable slack is provided for patch member 14, as shown in FIG. 5, movement of patch member 14 does not displace entire cable bundles within channels 50. Additionally, restraints 54 can prevent translation of cable bundles when unwanted pulling of single cables 32 and 33 occurs. Restraint 54 may comprise a cable tie.

Enclosure 10 is particularly useful for building automation equipment employing ethernet communication pathways. Ethernet cables may extend from building automation equipment to patch members 14 and communication devices 22, all of which are positioned within single receptacle 11.

Enclosure 10 and mounting panel 16 may be constructed of metal or other similar materials known to those of skill in the art. These parts may be machined. Hinged patch member 14 may be installed and the dimensions of communication devices 22 may be calculated to determine their respective positioning within enclosure. Thereafter, these components may be mounted on mounting device 16 within enclosure 10.

After enclosure 10 is fabricated, it may be mounted on a wall or within a plenum space of a building. Plenum, as used herein, means an enclosed space used to affect air distribution within a building, such as beneath the floor or within the ceiling. Often, the space beneath the floor or between a structural ceiling and a drop ceiling is used as plenum space in a building's HVAC design. When enclosure 10 is positioned within such plenum space, it is typically mounted on a bottom surface of the floor or on the structural ceiling. Cable penetration into enclosure 10 may be sealed with a compressed gasket to prevent airflow within enclosure 10 from exiting into the plenum space. Thus, cooling ports 18 and like components for air exchange between the interior of enclosure 10 and plenum space may be eliminated from enclosure 10. Other alterations to enclosure 10 may also be made. When enclosure 10 is positioned within a ceiling, for example, door 12 may be hinged to a bottom portion of enclosure 10, with electrical components mounted to door 12, for ease of access.

After enclosure is mounted, patch member 14 is tilted downward about its hinge, and, as shown in FIG. 1, incoming first cables 32 extending from telecommunications equipment in locations remote from enclosure apparatus 10 are permanently or releasably secured to a rear of patch member 14. Second cables 33 extending from communication device 22 may be permanently or releasably secured to a front of patch member 14. When cable separators 44 are employed, first and second cables 32 and 33 may be positioned in channels 50 to prevent co-mingling of high and low voltage cabling. Connection points for the cabling may, however, be reversed.

Figure 6:
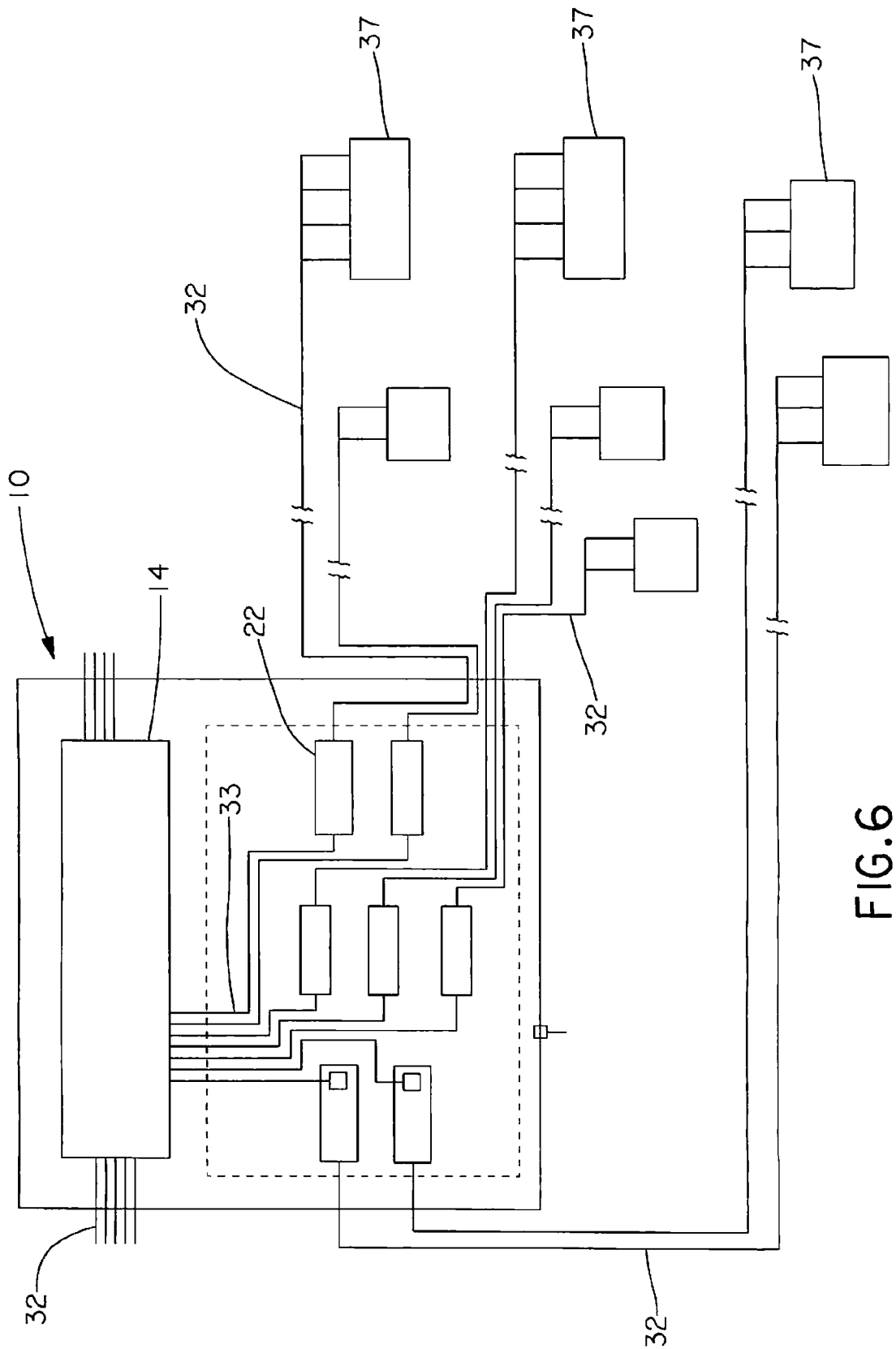
FIG. 6 is a schematic view of one embodiment of the system of the present invention.

One embodiment of a system employing the enclosure apparatus of the present invention is shown in the schematic of FIG. 6. As shown in FIG. 6, first cables 32 extending from a telecommunications room extend into a single receptacle 11, which also includes communication devices 22. First cables 32 extending from the telecommunications equipment and second cables 33 extending from communication devices 22 may connect with at least one electrical connector positioned within patch member 14. These connections may or may not comprise ethernet communications.

The enclosure apparatus 10 of the present invention may provide a number of advantages. By eliminating separate boxes-one for patch member 14 and the other for communication devices 22-enclosure space, material cost, and labor cost can be saved. This configuration may also provide increased immunity to radio frequency interference, since cables extending from low voltage equipment to a zone box benefit from the protection of the conductive enclosure rather than exposure to the external environment. Enclosure 10 also facilitates maintenance, as personnel have quicker access to various components within a single enclosure. Similarly, moves, adds, and changes become simplified, since the evolution and adoption of ethernet enabled actuators, sensors, and other end devices require less disassembly and removal of legacy equipment. Removal of abandoned application specific control elements from the inventive zone enclosure results in additional space for ethernet equipment such as midspan power injectors, switches, patch panels, power splitters, and other peripherals.

Variations, modifications and other implementations of what is described herein will occur to those of ordinary skill in the art without departing from the spirit and scope of the invention. Accordingly, the invention is in no way limited by the preceding illustrative description.

We claim:

1. An enclosure apparatus comprising:
    a single receptacle comprising a base member mountable to a building structure and walls connected to the base member;
    a patch member positioned within the single receptacle and rotatably connected to the base member via at least one hinge, the patch member connectable to at least one data cable, the at least one data cable entering the single receptacle from a first location remote therefrom; and
    at least one communication device positioned within the single receptacle, the communication device connected to the patch member via at least one patch cable, wherein the communication device receives data from the first location via the patch member, processes the received data using an internal microprocessor, and transmits a communication based at least in part on the processed data to one or more devices positioned at a second location remote from the enclosure apparatus and the first location.

2. The enclosure apparatus of claim 1, wherein at least one of the walls defines an opening comprising a vent.

3. The enclosure apparatus of claim 1, wherein a grounding stud is secured to at least one of the walls.

4. The enclosure apparatus of claim 1, further comprising a mounting device positioned within the receptacle, the mounting device for receiving and carrying the communication device.

5. The enclosure apparatus of claim 1, wherein the communication device comprises at least one of a controller and a sensor.

6. The enclosure apparatus of claim 1, wherein the patch member comprises at least one electrical connector comprising at least one of coaxial connectors, D-subminiature connectors, punchdown connectors, optical fiber connectors and rack-mounted modular ethernet connectors.

7. The enclosure apparatus of claim 1, wherein the second location comprises building automation equipment selected from the group consisting of heating and cooling equipment, physical access control equipment, fire detection equipment, video surveillance equipment, lighting equipment and time-related equipment.

8. The enclosure apparatus of claim 1, Farther comprising a cable separator comprising a barrier wall positioned between the patch member and the communication device.

9. An enclosure apparatus comprising:
    a single receptacle comprising a base member mountable to a building structure and walls connected to the base member;
    a patch member positioned within the single receptacle, the patch member connectable to at least one data cable, the at least one data cable entering the single receptacle from a first location remote therefrom; and
    at least one communication device positioned within the single receptacle, the communication device connectable to the patch member, wherein the communication device receives data from the first location, processes the received data using an internal microprocessor, and transmits a communication based at least in pan on the processed data to one or more devices positioned at a second location remote from the enclosure apparatus and the first location.

10. The enclosure apparatus of claim 9, wherein the communication device is a controller or a sensor and the one or more devices in the second location comprise building automation equipment.

11. The enclosure apparatus of claim 9, wherein the patch member is rotatably connected to the base member via at least one hinge.

12. The enclosure apparatus of claim 9, wherein the communication device is connected to the patch member via at least one patch cable.

* * * * *

UNITED STATES PATENT AND TRADEMARK OFFICE
CERTIFICATE OF CORRECTION

| | | |
|---|---|---|
| PATENT NO. | : 7,737,360 B2 | |
| APPLICATION NO. | : 11/383667 | |
| DATED | : June 15, 2010 | |
| INVENTOR(S) | : James F. Wiemeyer et al. | |

It is certified that error appears in the above-identified patent and that said Letters Patent is hereby corrected as shown below:

"The enclosure apparatus of Claim 1, Farther comprising" should read "The enclosure apparatus of Claim 1, further comprising".

Signed and Sealed this
Tenth Day of January, 2012

David J. Kappos
*Director of the United States Patent and Trademark Office*

UNITED STATES PATENT AND TRADEMARK OFFICE
CERTIFICATE OF CORRECTION

PATENT NO. : 7,737,360 B2
APPLICATION NO. : 11/383667
DATED : June 15, 2010
INVENTOR(S) : James F. Wiemeyer et al.

It is certified that error appears in the above-identified patent and that said Letters Patent is hereby corrected as shown below:

Column 8, line 21 (Claim 8, line 1)
"The enclosure apparatus of Claim 1, Farther comprising" should read "The enclosure apparatus of Claim 1, further comprising".

This certificate supersedes the Certificate of Correction issued January 10, 2012.

Signed and Sealed this
Fourteenth Day of February, 2012

David J. Kappos
*Director of the United States Patent and Trademark Office*